(12) United States Patent
Gupta

(10) Patent No.: US 8,113,784 B2
(45) Date of Patent: Feb. 14, 2012

(54) COOLABLE AIRFOIL ATTACHMENT SECTION

(75) Inventor: Shiv C. Gupta, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 398 days.

(21) Appl. No.: 12/407,818

(22) Filed: Mar. 20, 2009

(65) Prior Publication Data
US 2010/0239430 A1 Sep. 23, 2010

(51) Int. Cl.
F01D 5/30 (2006.01)

(52) U.S. Cl. ..... 416/193 A; 415/95; 415/115; 416/96 R; 416/97 R; 416/220 R

(58) Field of Classification Search ............ 415/95, 415/115; 416/96 R, 97 R, 193 A, 220 R
See application file for complete search history.

(56) References Cited

U.S. PATENT DOCUMENTS

| 4,180,373 A | 12/1979 | Moore et al. |
|---|---|---|
| 4,416,585 A | 11/1983 | Abdel-Messeh |
| 4,582,467 A | 4/1986 | Kisling |
| 4,726,735 A | 2/1988 | Field et al. |
| 4,768,924 A | 9/1988 | Carrier et al. |
| 4,940,388 A | 7/1990 | Lilleker et al. |
| 5,984,636 A | 11/1999 | Fahndrich et al. |
| 6,176,677 B1 | 1/2001 | Chevrefils et al. |
| 6,183,193 B1 | 2/2001 | Glasspoole et al. |
| 6,257,831 B1 | 7/2001 | Papple et al. |
| 6,406,260 B1 | 6/2002 | Trindade et al. |
| 6,416,284 B1 * | 7/2002 | Demers et al. ............. 416/97 R |
| 6,533,550 B1 | 3/2003 | Mills |
| 6,609,884 B2 | 8/2003 | Harvey |
| 6,735,956 B2 | 5/2004 | Romani |
| 6,832,893 B2 | 12/2004 | Chevrefils et al. |
| 7,097,425 B2 | 8/2006 | Cunha et al. |
| 7,195,448 B2 | 3/2007 | Levine et al. |
| 7,210,906 B2 | 5/2007 | Papple |
| 7,278,827 B2 | 10/2007 | Boury et al. |
| 7,300,250 B2 | 11/2007 | Papple |
| 7,347,671 B2 | 3/2008 | Dorling et al. |
| 7,357,623 B2 | 4/2008 | Leghzaouni et al. |
| 7,413,406 B2 | 8/2008 | Pietraszkiewicz et al. |
| 7,438,528 B2 | 10/2008 | Goodman et al. |
| 7,452,184 B2 | 11/2008 | Durocher et al. |
| 7,467,922 B2 | 12/2008 | Beeck et al. |

* cited by examiner

Primary Examiner — Asok Sarkar
(74) Attorney, Agent, or Firm — Carlson Gaskey & Olds P.C.

(57) ABSTRACT

A rotor blade suitable for use in a gas turbine engine includes an attachment section which defines at least one internal cooling passage along a passage axis through the attachment section.

18 Claims, 5 Drawing Sheets

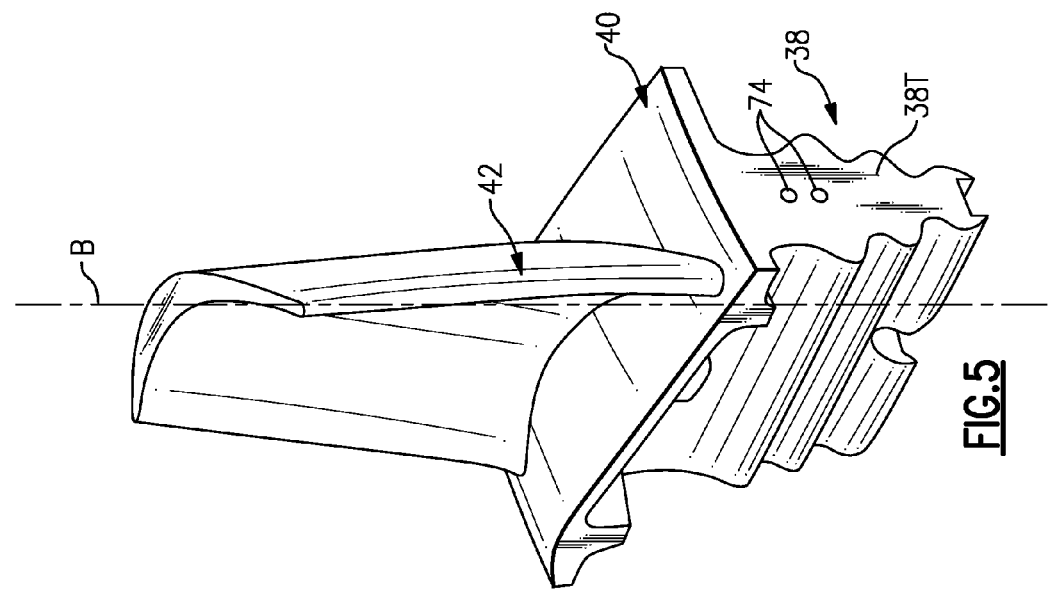
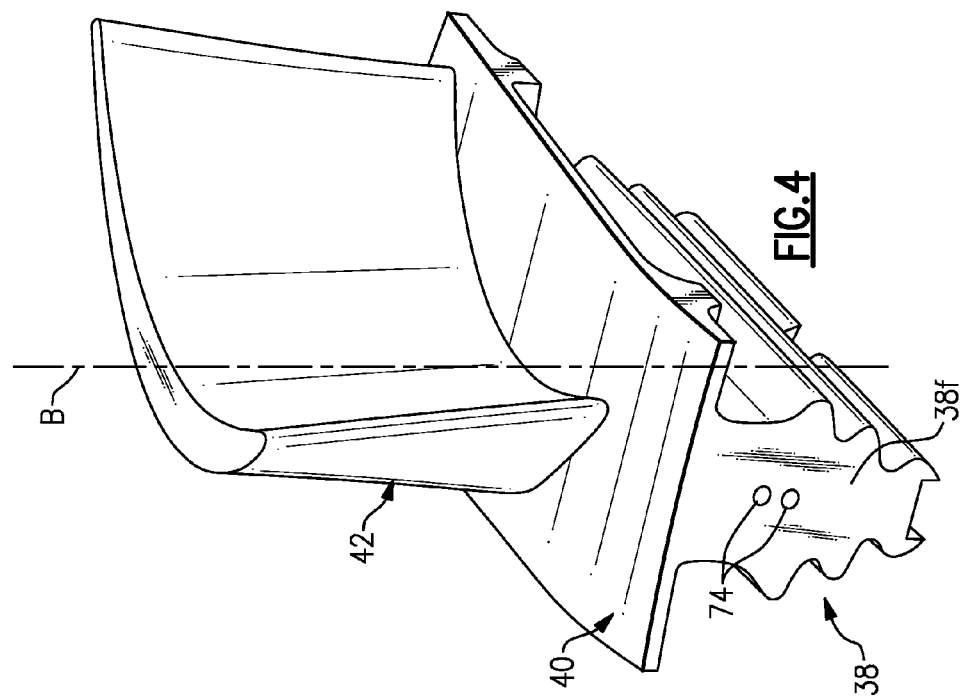

COOLABLE AIRFOIL ATTACHMENT SECTION

BACKGROUND

The present application relates to coolable airfoils of the type used in high temperature rotary machines such as gas turbine engines.

Efficiency is a primary concern in the design of any gas turbine engine. One principle technique to increase engine efficiency is elevation of core gas path temperatures. Internally cooled components manufactured from high temperature capacity alloys accommodate these elevated temperatures. Turbine stator vanes and blades, for example, are typically cooled using compressor air worked to a higher pressure, but still at a lower temperature than that of the engine core gas path.

Airfoil cooling may be accomplished by external film cooling, internal air impingement and forced convection either separately or in combination. In the attachment section of an airfoil, space between the faces of fir-tree lobes in the rotor blade attachment provides for passage of cooling air. The space, however, may be too small for effective cooling flow at the elevated core gas path temperatures of high efficiency gas turbine engines.

SUMMARY

A rotor blade suitable for use in a gas turbine engine according to an exemplary aspect of the application includes an attachment section which defines at least one internal cooling passage along a passage axis through the attachment section.

A rotor blade suitable for use in a gas turbine engine according to an exemplary aspect of the application includes an attachment section which extends from a platform section opposite an airfoil section along a blade axis, the attachment section defines at least one internal cooling passage along a passage axis.

A method of cooling a rotor blade according to an exemplary aspect of the application includes communicating a cooling airflow from a forward to an aft direction through a blade attachment section through at least one internal cooling passage.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is an expanded perspective view looking forward to aft of another embodiment of a rotor blade with a internal cooling passage;

FIG. 5 is an expanded perspective view looking aft to forward of another embodiment of a rotor blade with a internal cooling passage.

DETAILED DESCRIPTION

Figure 1:
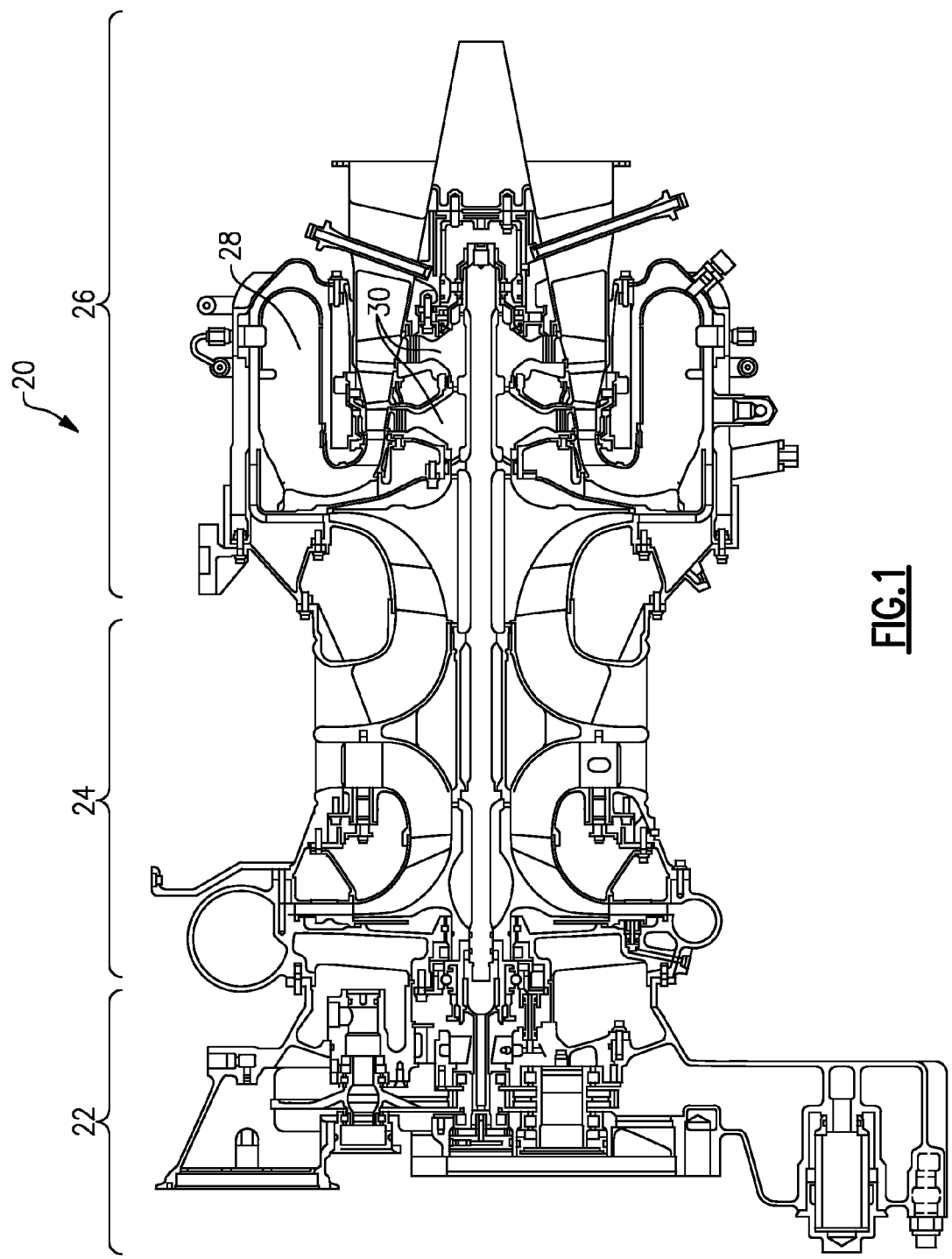
FIG. 1 is a general schematic partial fragmentary view of an exemplary gas turbine engine embodiment for use with the present invention.

FIG. 1 illustrates a general schematic view of a gas turbine engine 20 such as an auxiliary power unit (APU). Although a particular gas turbine engine configuration is illustrated and described in the disclosed embodiment, other gas turbine engines inclusive of high-bypass propulsion, low-bypass propulsion, and power generation may alternatively benefit herefrom.

The gas turbine engine 20 generally includes a gearbox section 22, a compressor section 24, and a turbine section 26. The turbine section 26 includes a combustor section 28 and a multiple of turbine rotor disk assemblies 30.

Figure 2:
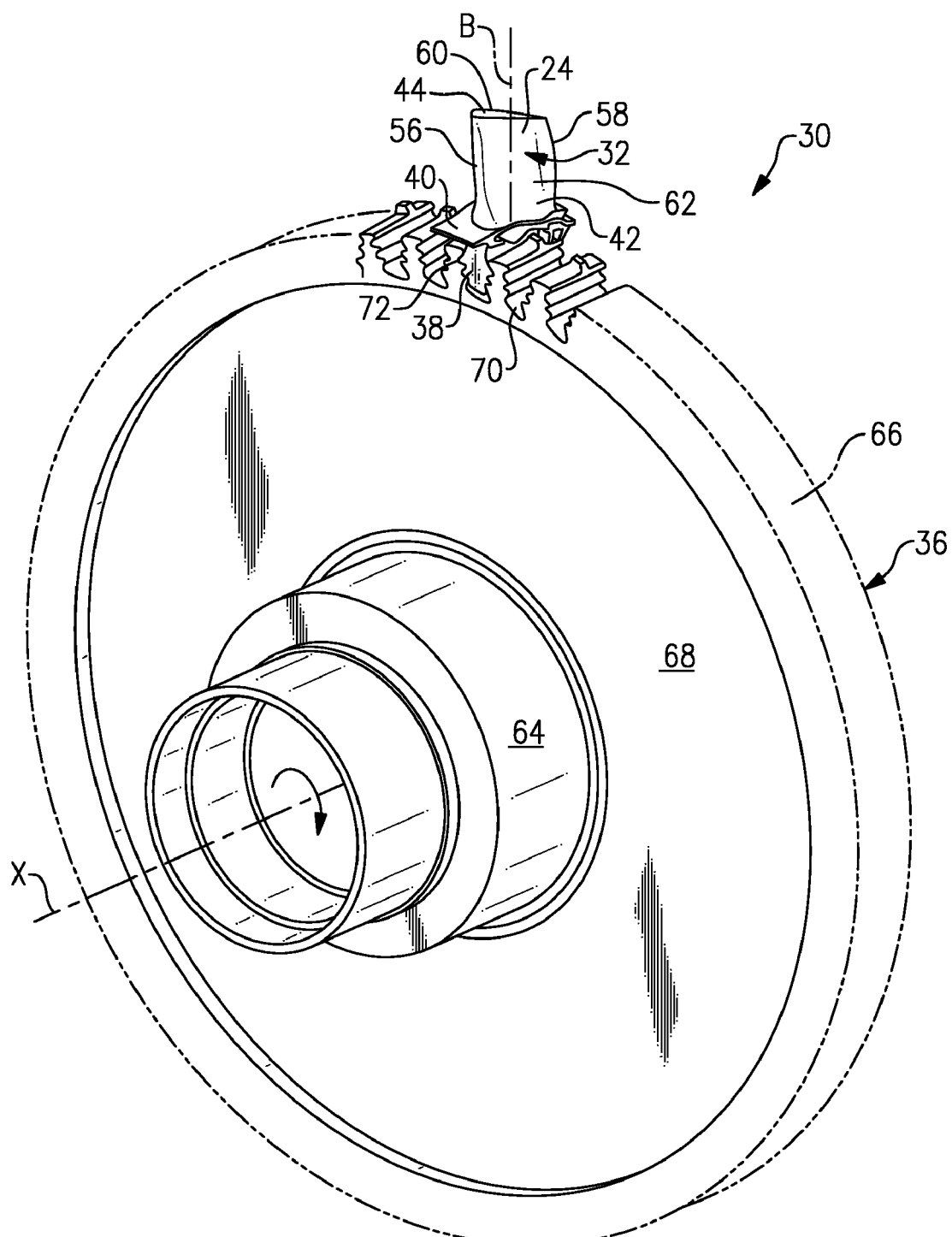
FIG. 2 is an expanded perspective view of a rotor blade mounted to a rotor disc.

Referring to FIG. 2, one rotor assembly 30 of the gas turbine engine 20 is illustrated. Although a particular rotor assembly 30 is illustrated and described in the disclosed embodiment, other sections which have other blades such as fan blades, low pressure turbine blades, high pressure turbine blades, high pressure compressor blades and low pressure compressor blades will also benefit herefrom.

The rotor assembly 30 includes a plurality of rotor blades 32 (one shown) circumferentially disposed around a rotor disk 36. Each blade 32 generally includes an attachment section 38, a platform section 40, and an airfoil section 42 which extends to a blade tip 44 along a blade axis B. The blade axis B is defined along a centerline of the attachment section 38 and extends radially from the engine axis of rotation A toward the blade tip 44 when the rotor blade 32 is installed in the rotor disk 36.

The blade 32 may be further defined by a leading edge 56 and a trailing edge 58. Defined between the leading edge 56 and the trailing edge 58 is a suction side 60 provided by a convex surface and a pressure side 62 provided by a concave surface opposite of the suction side 60.

The rotor disk 36 generally includes a hub 64, a rim 66, and a web 68 which extends therebetween. Each of the rotor blades 32 is received within a blade retention slot 70 formed within the rim 66 of the rotor disk 36. The blade retention slot 70 includes a contour such as a fir-tree or bulb type which corresponds with a contour 72 of the blade attachment section 38 to provide engagement therewith. The blade locking feature for axial retention has been removed for clarity.

Figure 3:
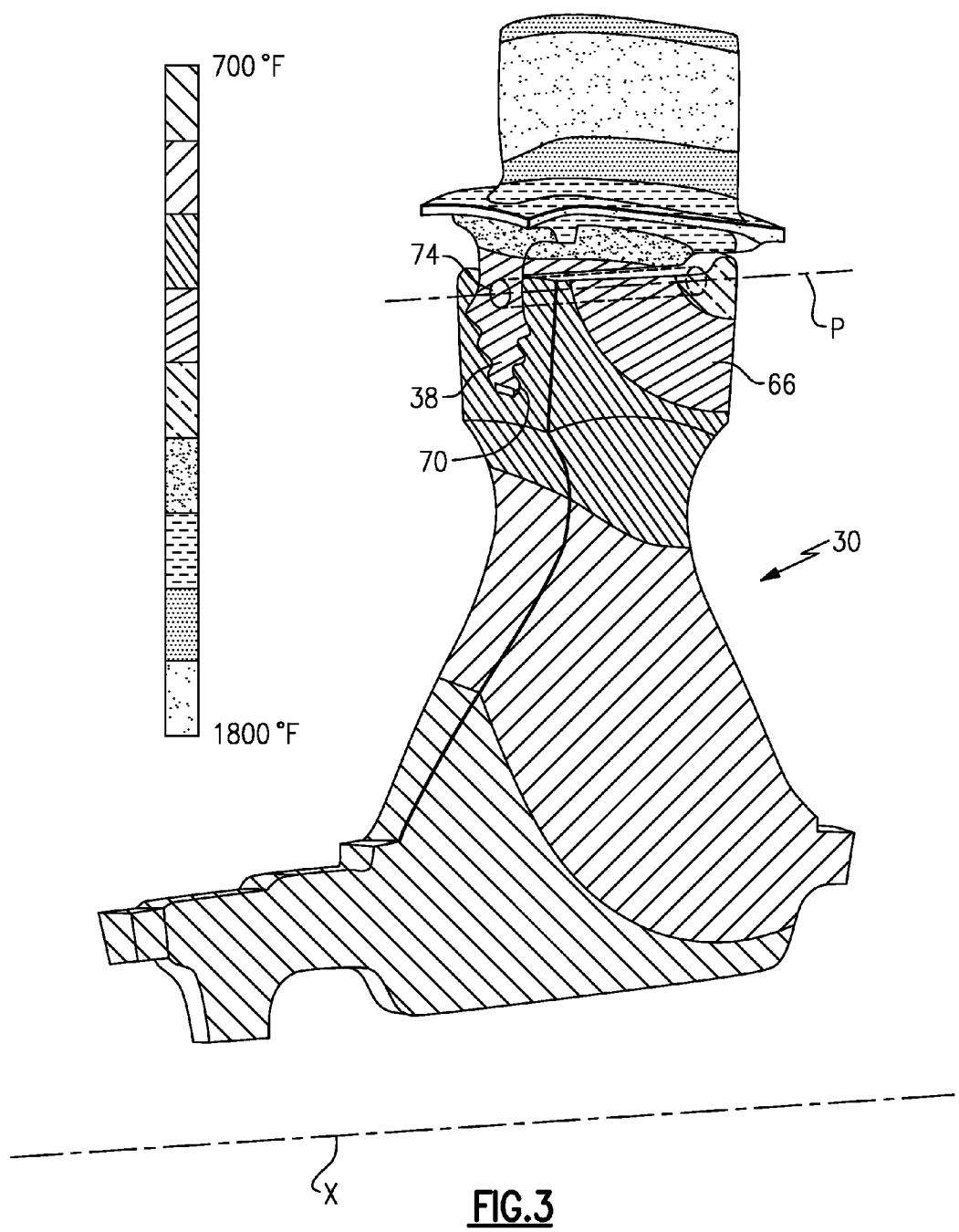
FIG. 3 is an expanded sectional view of a rotor disk to illustrate the rotor blade mounted therein along with the typical operating temperatures in degrees Fahrenheit.

Referring to FIG. 3, one non-limiting embodiment of a high pressure turbine blade 32 with at least one internal cooling passage 74 through the attachment section 38 is illustrated as attached to a section of the rotor disk 36 at typical exemplary operational temperatures in degrees Fahrenheit. Other internal cooling passages may alternatively or additionally be incorporated into the attachment section 38. The internal cooling passage 74 may be of a multiple configuration with cooling fluid typically being sourced as bleed air from the compressor section 24 (FIG. 1). It should be understood that although the high pressure turbine blade 32 is illustrated in one non-limiting embodiment, other blades (FIGS. 4 and 5) may alternatively or additionally include one or more of the internal cooling passages 74 as disclosed herein.

The internal cooling passage 74 in one non-limiting embodiment may be of an approximately 0.025" (0.635 mm) diameter along a passage axis P which is typically large enough to prevent blockage due to sand, dirt, etc. Even though the cooling passage shown herein has a circular cross-section, other shapes (oval, elliptical, etc.) may be used within constraints of available space, desired cooling efficiency and resultant stresses. The passage axis P is located through the attachment section 38 generally parallel to the blade retention slot 70 in an area which may be subject to temperatures of approximately 350-950 degrees F. (177-510 degrees C.) (FIG. 2). The passage axis P is defined generally along the broach angle of the blade retention slot 70 and transverse to the blade axis B. The blade plane P is located along a centerline of the attachment section between each contour 72 side between a leading edge section 38F and a trailing edge section 38T of the attachment section 38 (FIGS. 4 and 5).

Figure 6:
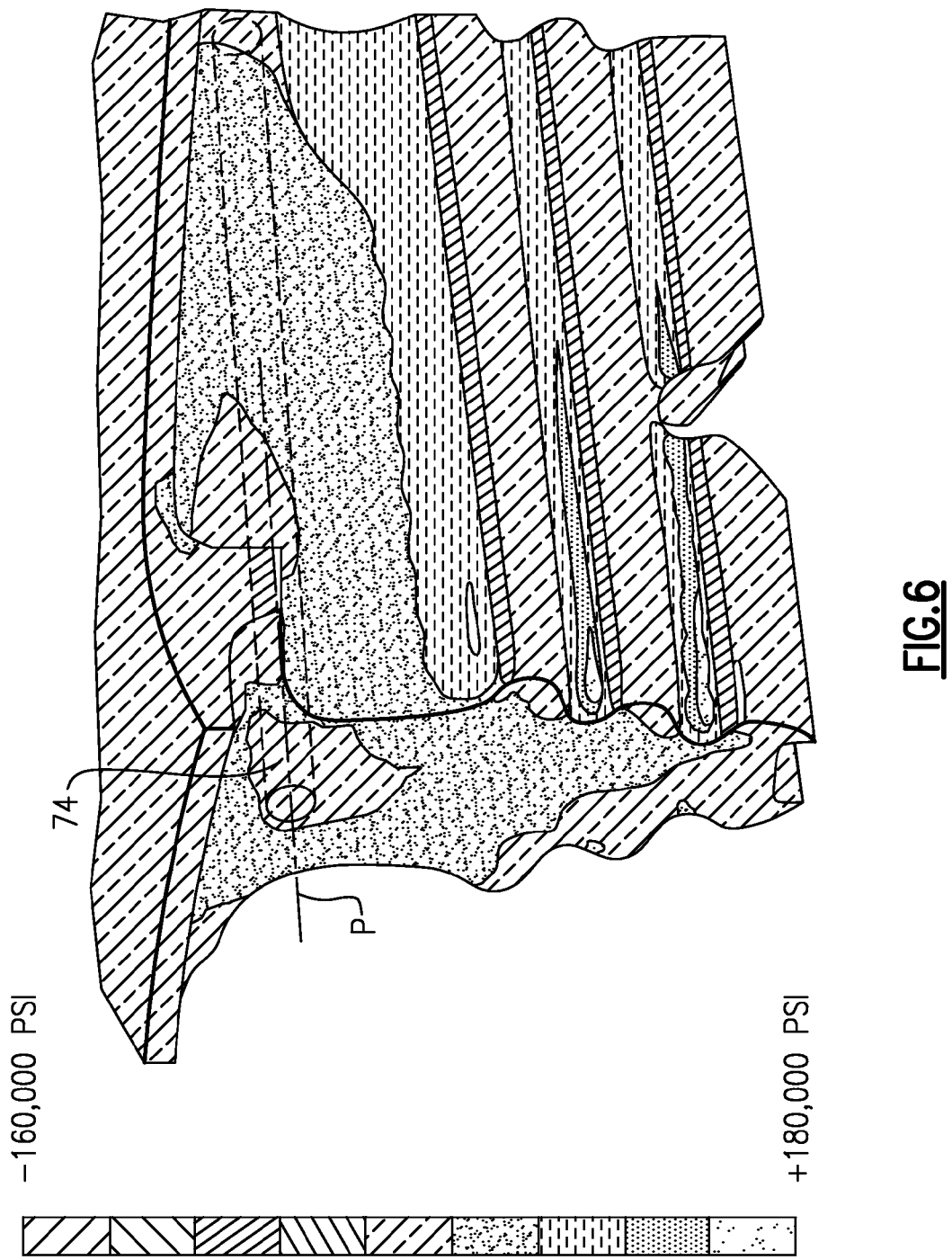
FIG. 6 is an expanded perspective view of the principle stresses in pounds per square inch of the rotor blade attachment section with respect to the internal cooling passage at approximately 49200 rpm.

The internal cooling passage 74 is located in a relatively low stress area of the attachment section 38 (FIG. 6). The resultant increased flexibility of the attachment section 38 due to the internal cooling passage 74 facilitates uniform distribution of the loads on the fir-tree lobes and reduce bending stresses at the fillets between the lobes. The internal cooling passage 74 in one non-limiting embodiment may be located above an uppermost lobe adjacent the platform section 40 of the contour 72.

Cooling air enters the internal cooling passage 74 at a forward section, travels through the internal cooling passage 74 to absorb thermal energy from the attachment section 38, the platform section 40, the airfoil section 42 and the blade retention slot 70, then exits the internal cooling passage 74 on the aft end. The cooling fluid flows through the internal cooling passage 74 to continuously remove thermal energy. The quantity of the cooling air may be controlled by the size and number of the internal cooling passage 74.

In one non-limiting embodiment typical of an auxiliary power unit (FIG. 1), the turbine section often includes two stages such that the first stage operates at relatively hotter temperature than the second stage. The internal cooling passage 74 may be located only within the relatively higher temperature first stage such that cooling air from the first stage exits in the space between the aft section of the first stage rotor blades and the forward section of the second stage nozzle so as to minimize hot air ingestion into the space between the turbine disks 30.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A rotor blade suitable for use in a gas turbine engine comprising:
   an attachment section which defines at least one internal cooling passage along a passage axis through said attachment section, said internal cooling passage extends through a leading edge section and a trailing edge section of said attachment section.

2. The rotor blade as recited in claim 1, wherein said passage axis is transverse to a blade axis of said rotor blade.

3. The rotor blade as recited in claim 1, wherein said at least one internal cooling passage includes a multiple of internal cooling passages, each of said multiple of internal cooling passages define a passage axis transverse to a blade axis of said rotor blade.

4. The rotor blade as recited in claim 1, wherein said internal cooling passage is parallel to a contour defined by said attachment section.

5. The rotor blade as recited in claim 1, wherein said internal cooling passage is an approximately 0.025" (0.635 mm) diameter.

6. The rotor blade as recited in claim 1, wherein said passage axis is parallel to an axis of rotation of the gas turbine engine.

7. The rotor blade as recited in claim 1, wherein said internal cooling passage extends completely within said attachment section.

8. A rotor blade suitable for use in a turbine engine comprising:
   a platform section;
   an airfoil section which extends from said platform section; and
   an attachment section which extends from said platform section opposite said airfoil section, said attachment section defines at least one internal cooling passage along a passage axis, said internal cooling passage extends through a leading section and a trailing edge section of said attachment section.

9. The rotor blade as recited in claim 8, wherein said passage axis is transverse to a blade span.

10. The rotor blade as recited in claim 8, wherein said internal cooling passage is located along a centerline of said attachment section.

11. The rotor blade as recited in claim 8, wherein said at least one internal cooling passage is located above an upper lobe adjacent said platform section.

12. A method of cooling a rotor blade comprising:
    communicating a cooling airflow through an internal cooling passage that extends through a leading section and a trailing edge section in a forward to an aft direction through a blade attachment section.

13. A method as recited in claim 12, further comprising:
    communicating the cooling airflow through a multiple of parallel internal cooling passages.

14. A rotor blade suitable for use in a gas turbine engine comprising:
    an attachment section which defines at least one internal cooling passage along a passage axis through said attachment section, said passage axis parallel to an axis of rotation of the gas turbine engine.

15. The rotor blade as recited in claim 14, wherein said internal cooling passage extends through a leading section and a trailing edge section of said attachment section.

16. The rotor blade as recited in claim 14, wherein said internal cooling passage extends completely within said attachment section.

17. The rotor blade as recited in claim 14, wherein said attachment section includes a multiple of lobes.

18. The rotor blade as recited in claim 14, wherein said attachment section defines a fir-tree shape.

* * * * *